United States Patent [19]
Christofer

[11] 3,940,577
[45] Feb. 24, 1976

[54] METHOD AND APPARATUS FOR CONTROLLING A TRANSFER CAR FROM A REMOTE STATION

[75] Inventor: Donald E. Christofer, Willowick, Ohio

[73] Assignee: Stock Equipment Company, Cleveland, Ohio

[22] Filed: June 12, 1974

[21] Appl. No.: 478,588

[52] U.S. Cl............ 191/12 R; 191/12.2 R; 254/174; 214/18 N
[51] Int. Cl.² ........................................ H02G 11/00
[58] Field of Search........ 191/12 R, 12.2 R, 12.2 A, 191/12.4; 254/147, 149, 150 R, 172, 173 R, 174, 175.5, 183; 214/18 R, 18 N, 18 GD, 18 SC

[56] References Cited
UNITED STATES PATENTS

| | | | |
|---|---|---|---|
| 2,513,812 | 4/1950 | McClay | 254/174 |
| 3,445,012 | 5/1969 | Freeborg | 214/18 N |
| 3,793,904 | 2/1974 | Grable | 254/178 |
| 3,811,017 | 5/1974 | Eisen | 191/12 R |

Primary Examiner—Lloyd L. King
Assistant Examiner—D. W. Keen
Attorney, Agent, or Firm—Bosworth, Sessions & McCoy

[57] ABSTRACT

A remote control method and apparatus for use in association with a movable carriage illustrated as a transfer car for handling radioactive materials. The car has a self-contained drive motor energized from a remote power source, and travels in forward and reverse directions in a predetermined path between at least two predetermined operating stations in a closed operating space defined by protective walls. The travel of the car in both directions is automatically halted by means of limit switch means located outside the closed space, to de-energize the power source for the drive motor. A rotary shaft extending through a wall of the enclosed space is rotated in one direction in response to forward travel of the car and in the opposite direction in response to the reverse travel of the car. An adjustable switch means is located on the outside of the chamber wall to halt the car at the predetermined limit position.

15 Claims, 9 Drawing Figures

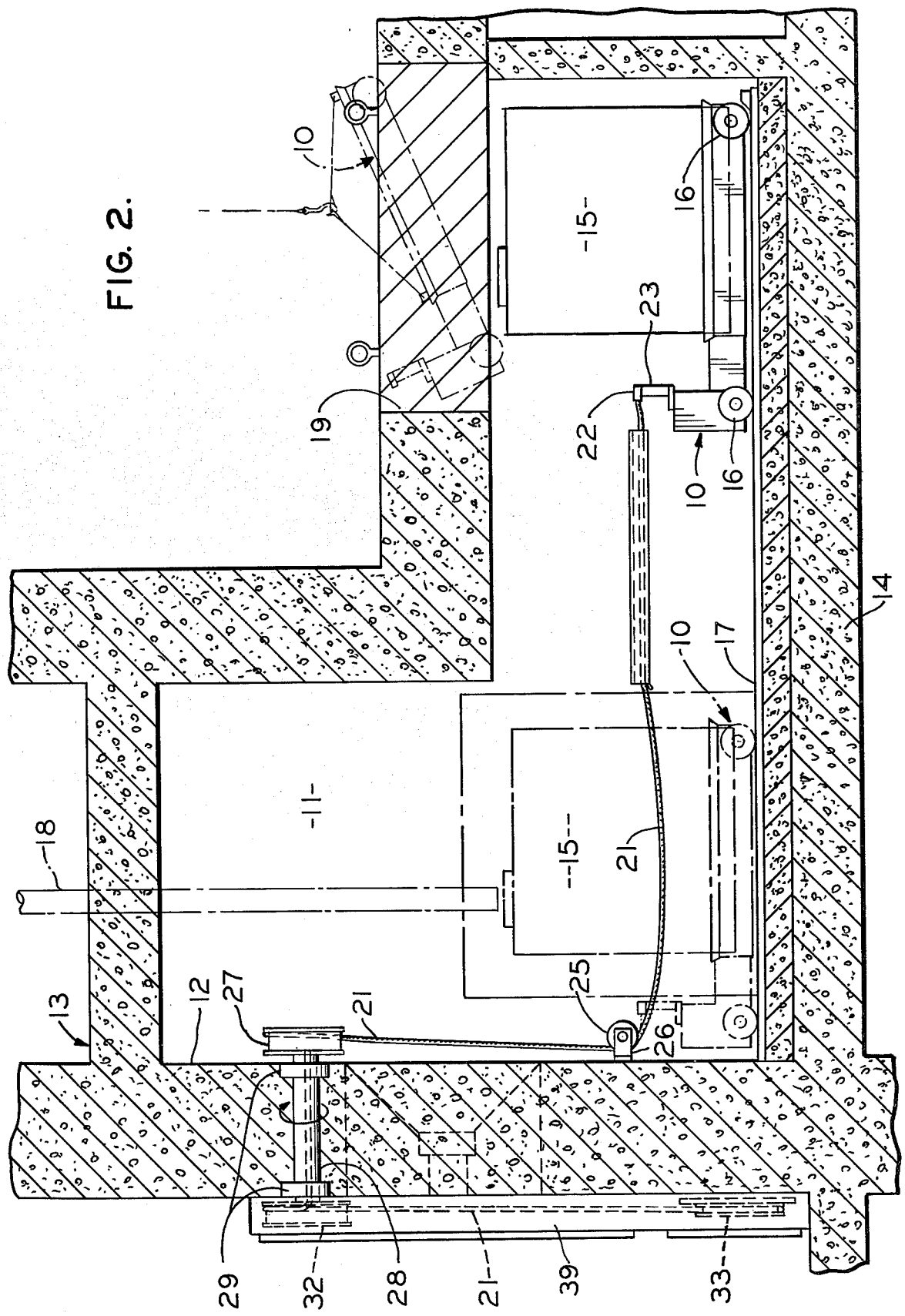

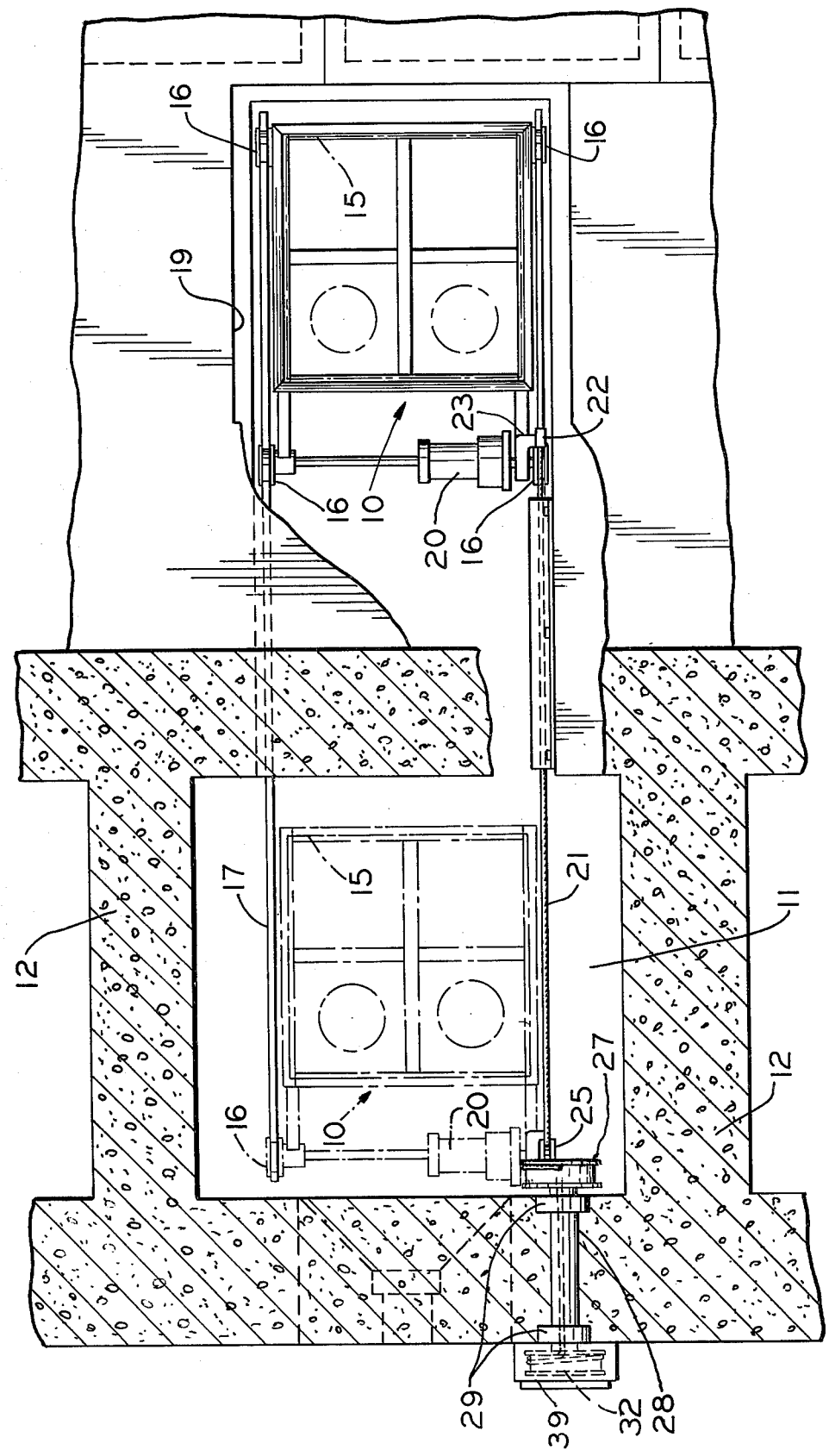

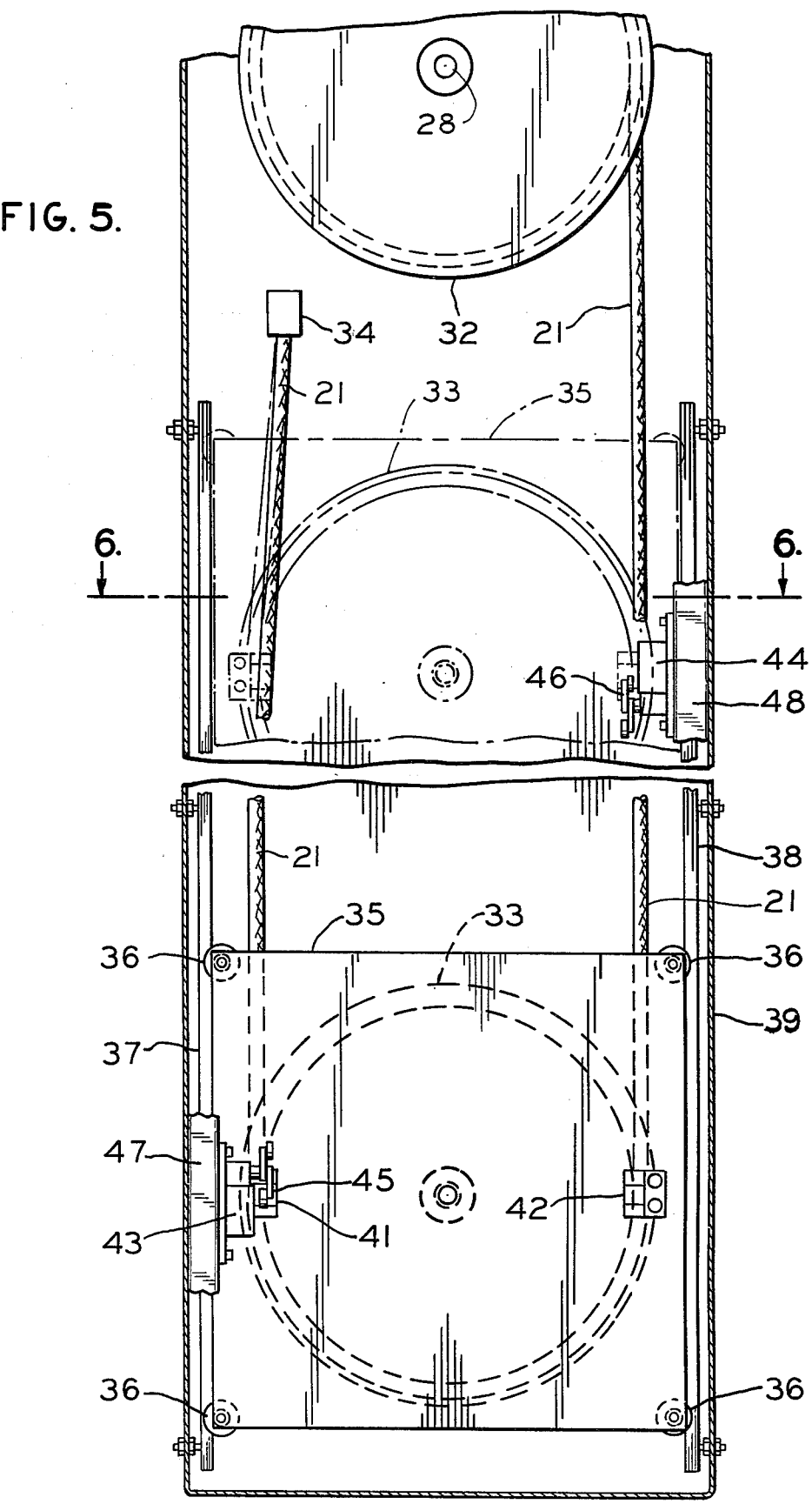

METHOD AND APPARATUS FOR CONTROLLING A TRANSFER CAR FROM A REMOTE STATION

BACKGROUND OF THE INVENTION

This invention relates to the remote control of material handling equipment such as for handling radioactive material as radioactive waste material. More particularly, the invention relates to a method and apparatus for controlling and energizing, if desired, from a remote station, a movable carriage such as a car located in an operating space defined at least in part by a wall. Although useful for other purposes, the invention provides particular advantages in connection with the handling of radioactive materials produced or used in nuclear power generating stations, and it will be described below in connection with radioactive waste materials.

Nuclear power generating stations develop radioactive waste materials that must be disposed of, usually by placing them in containers that are removed to burial sites. These radioactive wastes usually are in the form of fluent slurries of radioactive particles in liquids but may take other forms such as radioactive cotton waste or radioactive portions of equipment.

The placing of radioactive waste material into a suitable container and handling a container having such material is a complex operation and must be accomplished in such a way that operating personnel will not be exposed to harmful radiation. Accordingly, the operation of introducing the waste material into the container must be performed in an enclosed chamber with walls that shield against passage of radioactivity harmful to human operators. It is particularly important that the operation be controlled in such a way that operators need not enter the space in which the radioactive material is placed in the container which, because of the high level of radioactivity present therein, is sometimes referred to as a "hot" area. Likewise, the external space shielded from harmful radiation and wherein operating personnel may work safely is often called a "safe" area.

Some previous techniques have utilized vehicles such as transfer cars for transporting the container between a filling station wherein radioactive material is introduced into the container, and a removal station whereat the container containing the radioactive material is removed from the car and carried away for storage. In order to operate the car, it is necessary to have equipment such as motors, electrical switches and other mechanisms within the "hot" area for energizing or control purposes. These all must have periodic maintenance that requires personnel to enter the "hot" area and thus, be exposed for periods of time to considerable radiation. This is, of course, undesirable and it is this type of operation that the present invention is intended to eliminate or greatly minimize.

The method and apparatus of the present invention reduce the types of dangers described above and afford other features and advantages heretofore not obtainable.

SUMMARY OF THE INVENTION

It is among the objects of the invention to control the operation of a movable carriage such as a car or the like adapted for travel between at least two stations, from a safe location remote from an enclosed operating space defined by protective walls.

Another object is to substantially reduce the danger to human opertors of exposure to radioactive contamination during the handling and movement of radioactive material, to a level where the radiation is not harmful to such operators in normal operation.

A further object is to minimize the number of mechanical and electrical connections which must be made between a shielded operating space wherein radioactive materials are handled and moved and a "safe" area outside such space, from which operations therein are controlled.

These and other objects are accomplished by the method and apparatus of the invention which are adapted to automatically indicate and halt the travel in forward and reverse directions at remotely adjustable predetermined limit positions of a movable carriage such as a transfer car or the like with its own drive motor. The power source for the drive motor is remote from the carriage which is located in a closed operating space (or "hot" area) defined by protective walls.

In accordance with the apparatus of the invention, a rotatable shaft extends through a wall with its inner and outer ends respectively extending into the "hot" area and into the outside space or "safe" area. Means associated with the shaft rotates the shaft in one direction as a linear function of the forward travel of the movable support such as a transfer car and in the opposite direction as a linear function of the reverse travel of the movable support. Adjustable means are provided external to the "hot" space and operatively connected to the shaft for stopping the drive motor in response to the direction and the amount of rotation of the shaft. Accordingly the movable support is stopped automatically when reaching one of the respective limit positions and the limit positions are adjustable from a remote location in the safe area.

BRIEF DESCRIPTION OF THE DRAWINGS

FIG. 2 is a side elevation illustrating the apparatus of FIG. 1;

FIG. 3 is a fragmentary plan view of the chamber and transfer car with control apparatus illustrated in FIGS. 1 and 2;

FIG. 5 is a fragmentary sectional view on an enlarged scale illustrating the external portion of the control system of the invention;

DESCRIPTION OF THE PREFERRED EMBODIMENT

Figure 1:
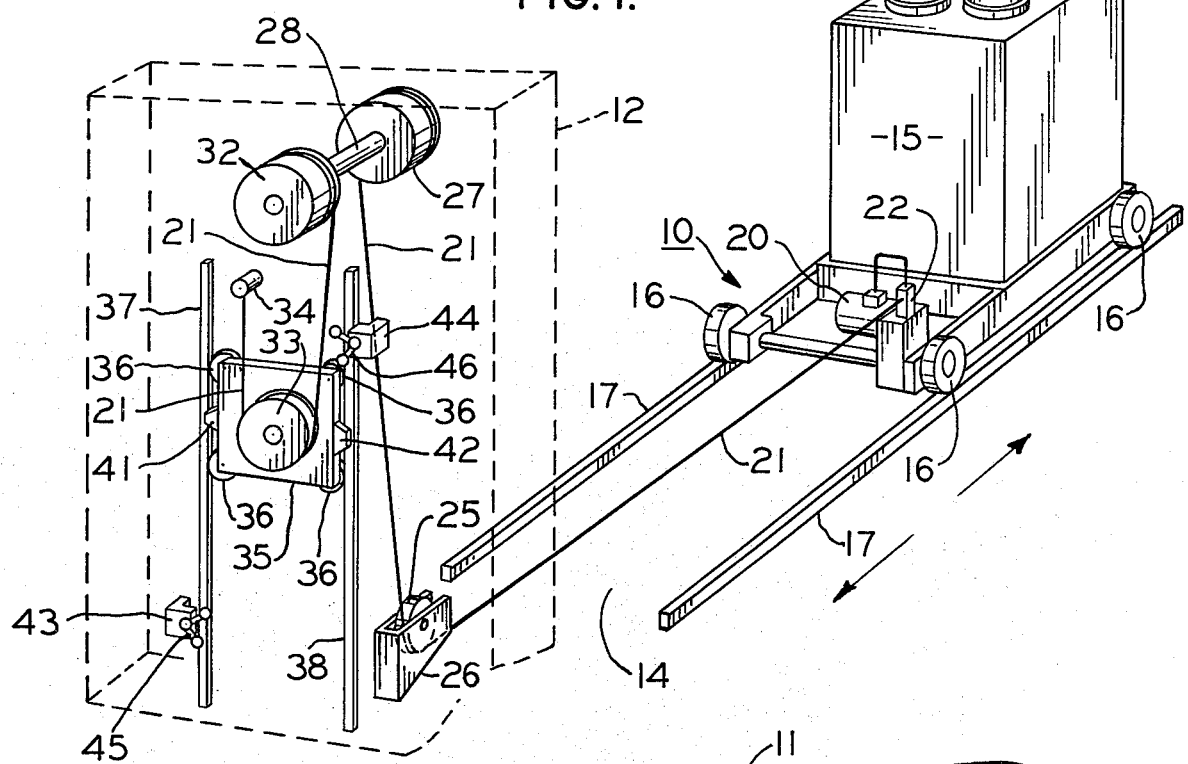
FIG. 1 is a fragmentary perspective view in somewhat diagrammatic form of apparatus embodying the invention comprising a transfer car adapted to carry a container holding radioactive waste material, between a filling position and an unloading position, in an enclosed chamber sealed by thick walls of concrete illustrated in dashed lines, together with associated control apparatus, the car being shown in an intermediate position between the ends of its path of travel, the direction of travel of the car and of the flexible control member being shown by arrows.
Figure 4:
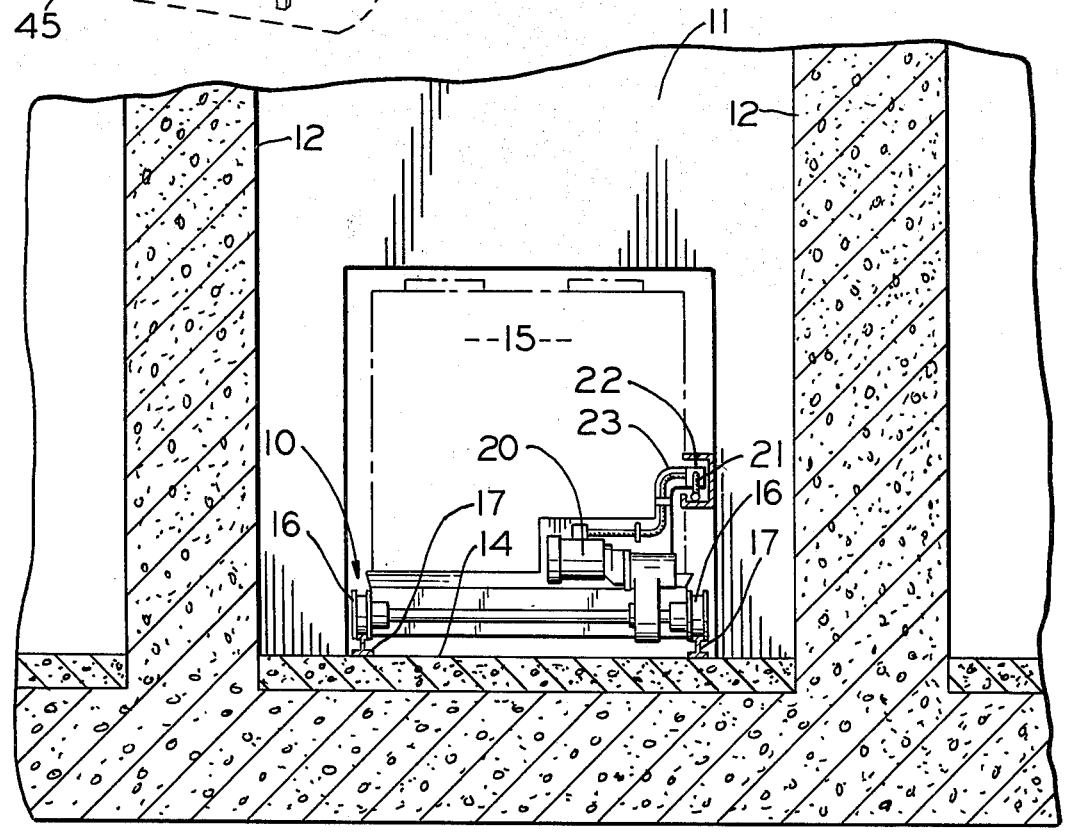
FIG. 4 is a fragmentary sectional view taken on the line 4—4 of FIG. 3 showing the radioactive waste material handling equipment illustrated in FIGS. 1, 2 and 3.

Referring more particularly to the drawings and initially to FIGS. 1 through 4, there is shown a carriage taking the form of transfer car 10 located in a shielding chamber 11, enclosed by thick concrete walls 12, ceiling 13 and floor 14 in which radioactive waste material is handled. The walls, ceiling and floor of chamber 11 are of such thickness and formed of such material that passage of radiation through them is greatly reduced to a level that is not harmful to human operators in locations outside the chamber. The transfer car 10 is adapted to carry at least one container 15. After the container 15 has the desired radioactive material put in it, it is removed and transported to a safe storage area.

The transfer car 10 has flanged wheels 16 which ride on parallel rails 17 supported on floor 14 and extending endwise in the chamber 11 so that the transfer car 10 is movable in a fixed path between a position illustrated in dashed lines in FIG. 2 and 3, below suitable known filling means 18 by which radioactive waste material is introduced into the container 15, and a removal hatch 19 at the opposite end of the chamber through which the containers are removed by a known overhead crane or the like. The removal hatch 19 is of sufficient size that the transfer car 10 itself may be lifted therethrough from the chamber 11 for repair and replacement.

The transfer car 10 has a drive means taking the form of a drive motor 20 connected through a clutch and reduction gear unit to a pair of wheels 16 at an end of the car. The motor 20 receives electrical power through a flexible cable 21 with electrical power conductors, that extends to and is removably connected to a junction box 22 mounted on an arm 23 extending from the front of the car 10. Cable 21 also contains circuits forming part of known control means, not shown, for causing the motor to rotate in opposite directions to move the car 10 in opposite directions. The cable 21, which is a flexible elongated power conveying member, extends generally parallel to the direction of travel of the transfer car 10 from the arm 23 to a pulley 25 supported in bearing brackets 26 mounted on the inside of the wall 12. From the pulley 25 the cable 21 passes upward to a drum 27 rigidly secured to a hollow shaft 28 that extends through the wall 12 perpendicular thereto and which is journaled in bearings 29 mounted on opposite side of the wall 12.

With this arrangement, forward movement of the car 10 from the position shown in dashed lines in FIGS. 2 and 3 to the forward limit position shown in solid lines in FIGS. 2 and 3 (i.e., the unloading position below the hatch 19 causes the cable to be pulled along by the arm 23 and thus rotates the drum 27 in a counterclockwise direction which in turn causes rotation of the shaft 28 in a counterclockwise direction. Movement of the transfer car 10 in the reverse direction from the position shown in solid lines in FIGS. 2 and 3 to the reverse limit position shown in dashed lines in FIG. 3 causes the shaft 28 to turn in the reverse direction and the drum 27 to wind up the cable due to a force urging the shaft 28 in a clockwise direction as will be described in detail below.

The end of the shaft 28 that extends into the safe area has rigidly secured to it another drum 32 around which the cable 21 is wound after it passes through the hollow shaft. From the drum 32, the cable 21 passes downwardly to a sheave 33 and then back up to a known fixed termination unit 34 mounted on the wall 12. Unit 34 connects the cable 21 to another conductor that extends to the power source (not shown).

Figure 6:
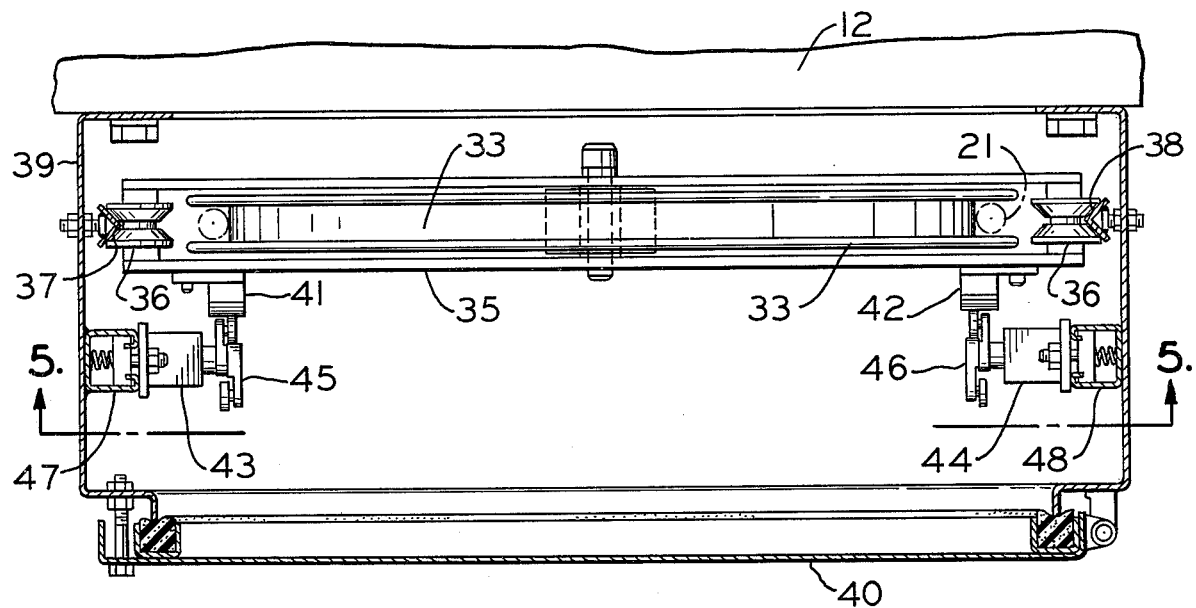
FIG. 6 is a cross sectional view taken on the line 6—6 of FIG. 5.

The sheave 33 is rotatably mounted on a sheave carrier unit 35 best illustrated in FIGS. 5 and 6. The carrier unit 35 comprises two parallel generally square plates of substantial comprises two parallel generally square plates of substantial weight with the sheave 33 rotatably mounted therebetween. Mounted at the corners of the carrier unit 35 are guide rollers 36 that define a V-shaped groove and which are adapted to travel along vertical guide tracks 37 and 38 as the cable 21 is either wound or unwound from the outer drum 32 to raise or lower the sheave 33 and the carrier unit.

As indicated in FIGS. 5 and 6, the sheave 33, sheave carrier unit 35 and tracks 37 and 38, are all located in a protective sheet metal enclosure 39 which is open at the top and extends vertically throughout the range of vertical travel of the sheave 33. The enclosure 39 has an access door 40 which is used to obtain access to the position and control elements to be described below.

Bolted to the front plate of the sheave carrier unit 35 at opposite sides are switch actuator cams 41 and 42 best shown in FIGS. 5 and 6. The cams 41 and 42 are adapted to operate upper and lower position control switches 43 and 44 respectively which are used to control the electrical power for operating the motor 20. Thus when either one of the switches is open the power supply is switched off and the transfer car 10 will stop at one of its predetermined limit positions. The upper and lower position control switches 43 and 44 each have a switch operating element 45 and 46 respectively with cam rollers that are engaged by the cams 41 and 42. The operating elements have double arms so that the switches 43 and 44 are opened when engaged by the respective cam 41 or 42 moving in one direction and closed when engaged by the respective cam moving in the opposite direction.

The switches 43 and 44 are mounted in vertical mounting brackets 47 and 48 in the form of U-shaped channels. The brackets 47 permit a range of vertical adjustment of the switches 43 and 44 in order to permit accurate adjustment of the limit positions of the transfer car 10. It will be noted that the switch 43 controls the reverse limit position of the transfer car (i.e., the position shown in dashed lines in FIG. 2) while the upper position control switch 44 controls the forward limit position of the transfer car 10.

Figure 9:
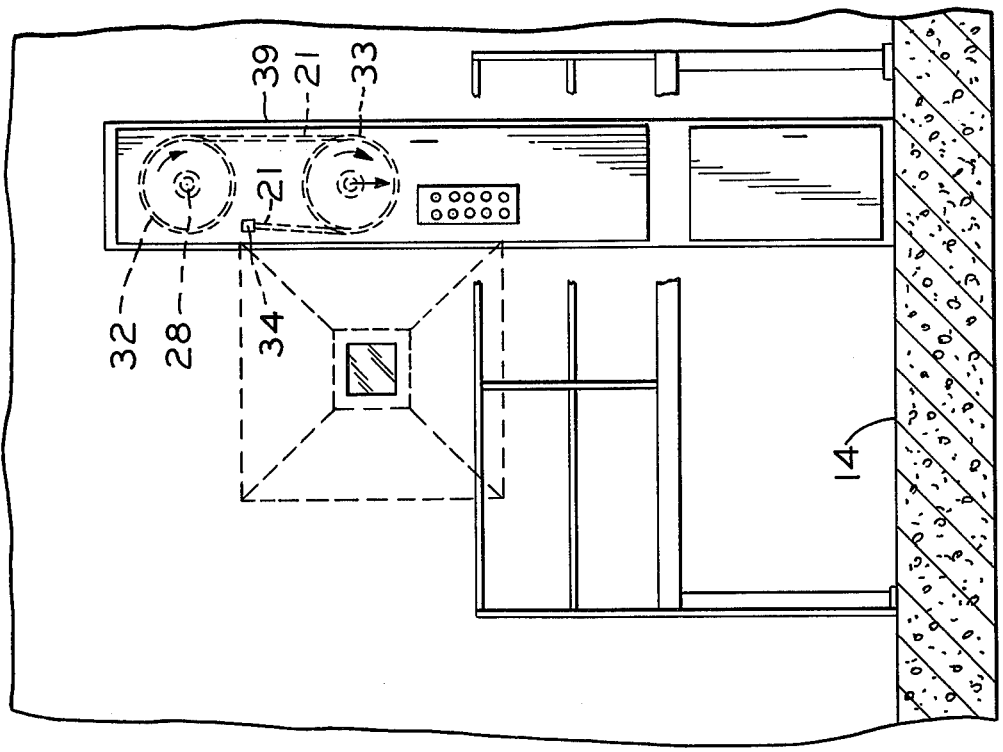
FIGS. 8 and 9 are both fragmentary elevational views indicating the two limit positions for the external portion of the control apparatus of the invention.
Figure 8:
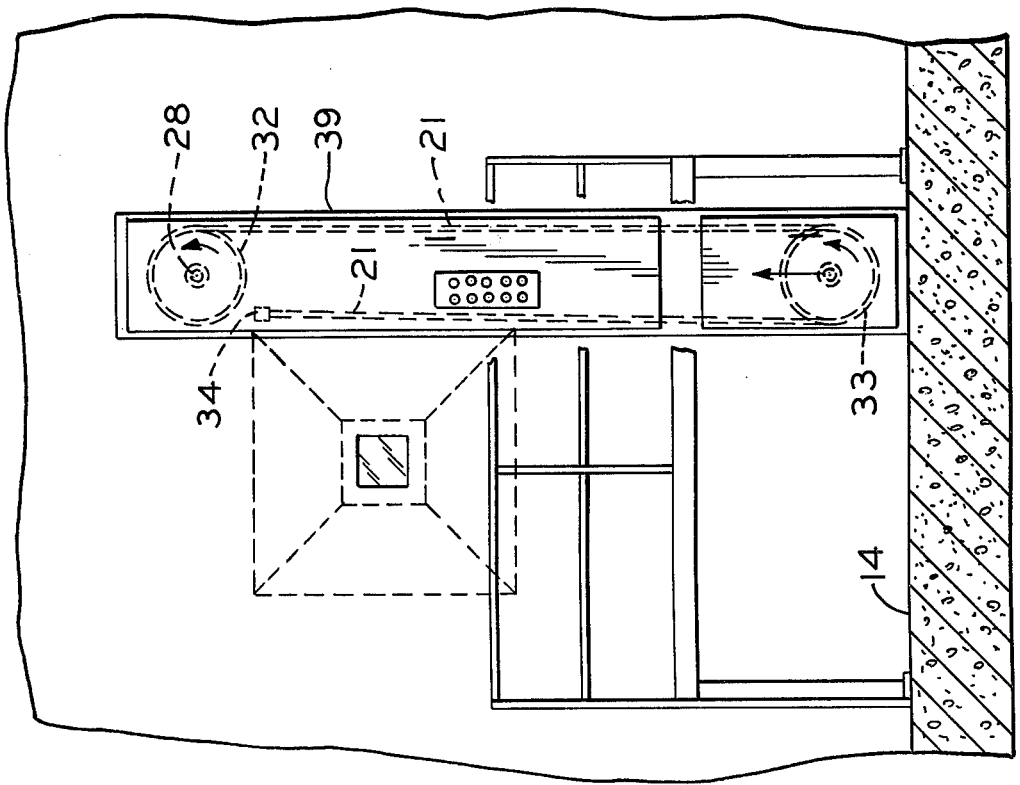

The sheave 33 and carrier unit 35, in the embodiment, have a range of vertical travel that is one-half the distance between the limit positions of the transfer car 10 as will be apparent in view of the mechanical advantage achieved with the particular class of pulley system utilized. Thus, the distance between the switches 43 and 44 is half the range of travel of the transfer car 10. FIGS. 8 and 9 illustrate the upper and lower limit positions of the sheave 33 throughout its travel within the enclosure 39.

Figure 7:
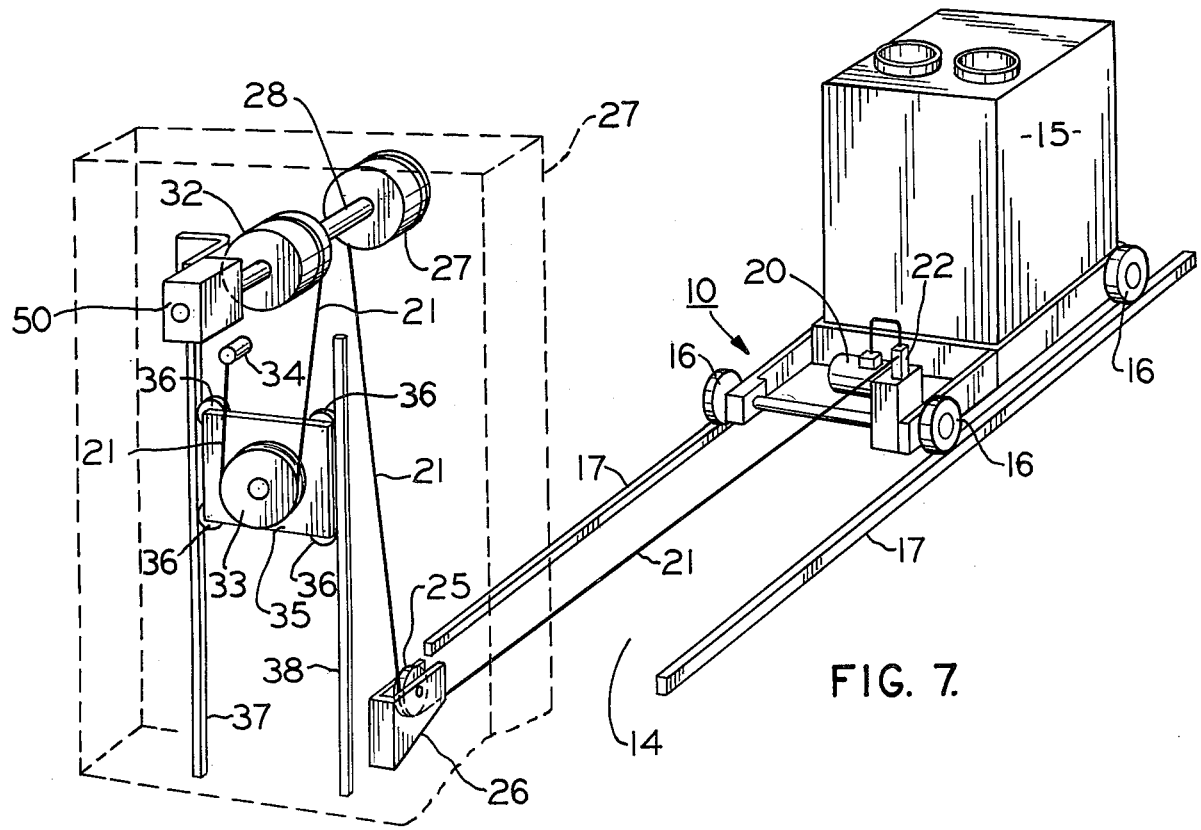
FIG. 7 is a perspective view in somewhat diagrammatic form similar to FIG. 1 illustrating an alternate form of control apparatus embodying the invention.

FIG. 7 illustrates a modified form of the invention wherein the switches 43 and 44 and switch operator cams 41 and 42 are eliminated and replaced by an alternate limit switch arrangement although the sheave 33 and sheave carrier unit 35 are still utilized to maintain proper tension on the cable throughout the forward the reverse travel of the transfer car 10. In accordance with the embodiment of FIG. 7, the automatic switching for the purpose of halting the transfer car 10 in its forward and reverse limit positions is accomplished by means of a geared rotary limit switch 50 connected to the end of the shaft 28 that projects into the safe area beyond the wall 12. The geared rotary limit switch 50 may be, for example, a type of switch identified by the trade designation CR115E, manufactured by General Electric Company. The geared rotary limit switch 50 opens the power supply circuit to the motor 20 after the switch mechanism has been rotated through an adjustable preselected number of turns and/or portions thereof to provide the desired amount of travel by the transfer car 10. The switch 50 is provided with a switching mechanism at both clockwise and counterclockwise limits of its rotary motion. The predetermined number of turns is adjustable to permit fine adjustment of the forward and reverse limit positions of the transfer car 10.

The operation of the equipment will be described for the purpose of illustration with respect to the embodiment of FIGS. 1 through 6, the operation of the embodiment of FIG. 7 being readily apparent from the discussion below and differing only with respect to the manner of making remote adjustments of the transfer car limit positions. For present purposes, the transfer car will be considered as initially positioned at its reverse limit position, or in other words directly below the filling means 18, with a container 15 carried thereon. The filling means will be lowered into the chamber to a position for discharging radioactive waste material and other components, if desired, such as solidifying material as cement, through a filling opening in the top of the container 15. When the container 15 has the desired amount of material, means 18 is withdrawn.

An operator then actuates the power source to deliver current to the motor 20. This causes the transfer car 10 to move forward toward its extended position or to the right as viewed in FIG. 2. As the car travels, the cable 21 is pulled along which causes the drums 27 and 32 and axle 28 to rotate in a counter clockwise direction as viewed in FIGS. 1, 8 and 9. This movement causes the sheave 33 to move from its lowermost position illustrated in FIG. 8 to its uppermost position illustrated in FIG. 9. The distance between these two positions is half the distance between the forward and reverse limit positions of the transfer car as illustrated in FIG. 2. As the transfer car 10 approaches the forward limit position beneath the unloading hatch 19, the cam 42 engages the switch actuator arm 46 of the upper limit switch 44. This opens the switch 44 cutting off the power to the motor 20 and the transfer car 10 stops in the forward limit position shown in FIG. 2.

From this position the filled container 15 is removed from the chamber and disposed of according to the procedures being used. Also an empty container is normally lowered onto the transfer car 10. The transfer car 10 is then returned to its loading position as desired. The reverse travel begins when an operator switches on the power supply to the motor 20. As the transfer car 10 begins its reverse travel, the sheave 33, which is keeping tension on the cable 21, will move from the upper position shown in FIG. 9 downward to the lower limit position shown in FIG. 8. The weight of the sheave carrier unit 35 is sufficient to maintain the desired tension on the cable 21 throughout the reverse travel of the transfer car.

As the transfer car moves in its reverse direction of travel or to the left as viewed in FIG. 2, the switch actuator cam 41 on the sheave carrier unit 35 engages the switch operating element 45 of the lower limit switch 43. This opens the switch 43 to cut off power to the motor 20 and thus halts the transfer car 10 in its reverse limit position.

The forward and reverse limit positions of the transfer car 10 may be adjusted merely by changing the vertical positions of the switch units 43 and 44 in their vertical mounting brackets 47 and 48.

Of particular importance in the operation of the equipment, is the taking up of slack in the cable 21 during the movement of the transfer car 10 in the reverse direction. It will be noted that during the reverse travel of the transfer car 10 tension is maintained in the cable 21 as it is wound on the drum 27. This function assures that the cable will not become entangled or interfere in any way with the movement of the transfer car.

The tensioning forces necessary to take up the slack in the cable 21 is provided by the sheave 33 and carrier unit 35 which urge the shaft 28 in a clockwise direction to wind the cable 21 on the drum 27.

A particular advantage of the invention thus described as compared with mechanisms available in the prior art is that it avoids the use of sliding electrical contacts such as slip rings for transmitting power to the transfer car motor. Sliding electrical contacts such as slip rings are vulnerable to failure resulting from breakage and wear, which would increase the need for maintenance service within the hot area with consequent possibilities of exposure of maintenance personnel to harmful radiation.

While the invention has been shown and described with respect to preferred embodiments thereof this is intended for the purpose of illustration rather than limitation and other modifications and variations of the specific forms herein shown and described will be apparent to those skilled in the art all within the intended spirit and scope of the invention. Accordingly, the patent is not to be limited to the specific embodiments herein shown and described nor in any other way that is inconsistent with the extent to which the progress in the art has been advanced by the invention.

I Claim:

1. Transfer apparatus comprising a wall, a carriage on one side of said wall adapted to move in a predetermined path between predetermined limit positions, said carriage having drive means adapted to move said carriage in either direction in said path; an elongated flexible control member connected to said carriage and passing through said wall to the other side of said wall; a rotatable member at the side of said wall at which said carriage is located onto which said flexible member winds as the carriage travels in one direction and from which it unwinds as the carriage travels in the other direction; a rotatable member at the other side of said wall to which said flexible member extends and on which said flexible member winds when said carriage is traveling in one direction and from which it unwinds when said carriage is traveling in the other direction; and means at the side of the wall opposite the side at which said carriage is located for controlling said drive means in response to the direction and amount of rotation of at least one of said rotatable members, whereby said carriage is stopped when reaching said limit positions.

2. The apparatus of claim 1 in which said flexible member winds onto said rotatable member at the side of said wall at which said carriage is located as said carriage travels in a first direction and unwinds from said rotatable member as said carriage travels in a second opposite direction; and in which said flexible member unwinds from said rotatable member on the other side of said wall as said carriage travels in said first direction and winds on said rotatable member as said carriage travels in said second opposite direction.

3. The apparatus of claim 2 in which said rotatable member are rigidly mounted on a common axle to rotate in unison.

4. The apparatus of claim 1 in which said flexible control member transmits power from a source on the side of said wall opposite that at which said carriage is located to energize said drive means on said carriage.

5. The apparatus of claim 4 in which said flexible control member transmits electrical power and said drive means includes an electrical switch adapted to be energized by said electrical power.

6. Apparatus as defined in claim 4 wherein said means for controlling said drive means comprises limit switches adapted to interrupt the supply of power from said power source.

7. Apparatus as defined in claim 6 wherein said drive means comprises an electrical motor and said limit switches are adapted to open and close the power supply circuit to said motor.

8. Apparatus as defined in claim 1 wherein movement of said carriage in said one direction pulls said flexible control member to turn said rotatable members in one direction and said flexible control member includes means biasing said rotatable members in their opposite direction whereby movement of said carriage in said other direction causes rotation of said rotary members in said opposite direction.

9. Apparatus for controlling the travel in forward and reverse directions, at predetermined limit positions, of a carriage having drive means therefor and being located in an operating space defined at least in part by a wall comprising:
an axle extending through said wall,
a flexible elongated power conveying member connected to said carriage at one end and operatively associated with said axle and adapted to transmit power to said drive means from a power source, said axle being rotated in one direction as a linear function of the forward travel of said carriage, and in the opposite direction as a linear function of the reverse travel of said carriage, and at which said carriage is located for controlling said power source said means including electrical switch means operable in response to the direction and amount of rotation of said axle,
whereby said carriage is stopped automatically when reaching said limit positions.

10. Apparatus for controlling from a remote outside location, a transfer car adapted for travel in a path between limit positions in a closed operating space defined by protective walls and having a drive means, comprising:
a rotary shaft extending through said wall,
an inner drum fixed to said shaft within said space,
an outer drum fixed to said shaft on the outside of said wall,
a first cable length connected at one end to said transfer car and having the opposite end portion wrapped around said inner drum,
a second cable length having one end wrapped around said outer drum, its outer end fixedly supported and having a fall therebetween supporting a weight element connected to a sheave that is raised and lowered in a vertical path by said cable fall
whereby said shaft and inner and outer drums move in one direction when said first cable length is pulled by said transfer car and in the opposite direction when said second cable length is pulled by said weight element moving downward as said transfer car moves in the opposite direction, and
means responsive to the position of said weight element for de-energizing said drive means when said transfer car reaches a predetermined position in said closed operating space.

11. A method for automatically halting the travel in forward and reverse directions at remotely adjustable predetermined limit positions, of a transfer car having a drive means and being located in a closed operating space within protective walls comprising the steps of:
converting linear motion of said transfer car in its forward direction between said limit positions into rotation in one direction of a shaft extending through said wall
operating a first switch means outside of said wall to stop said drive means, in response to a preselected number of turns of said shaft in said one direction whereby said transfer car is automatically halted at one of its predetermined limit positions,
converting linear motion of said transfer car in its reverse direction between said limit positions into rotation in the opposite direction, of said shaft,
operating a second switch means outside said wall to stop said drive means in response to a preselected number of turns of said shaft in said opposite direction whereby said transfer car is automatically halted in its other predetermined limit position.

12. A method as defined in claim 11 wherein said linear motion of said transfer car in its forward and reverse directions is converted into rotation of said shaft in said one direction and in said opposite direction respectively, by means of an elongated flexible control member connected to said carriage and operatively associated with said shaft within said closed operating space to wind and unwind thereabout in response to forward and reverse travel of said transfer car.

13. A method as defined in claim 12 wherein said flexible member extends through said shaft and is operatively associated with said shaft on the outside of said wall to unwind relative to said shaft on the other side of said wall as said tranfer car travels in one of its directions and winds relative to said shaft on the other side of said wall as said transfer car travels in the other of its directions.

14. A method as defined in claim 13 wherein said flexible control member transmits power from a source outside of said wall to energize said drive means on said carriage.

15. A method as defined in claim 13 wherein travel of said transfer car in one of its directions pulls said flexible control member to turn said shaft in one direction of rotation as said control member unwinds and wherein said shaft is biased in the opposite direction of rotation to wind said flexible control thereabout as said transfer car travels in the other of its directions.

* * * * *

UNITED STATES PATENT AND TRADEMARK OFFICE
CERTIFICATE OF CORRECTION

PATENT NO. : 3,940,577
DATED : February 24, 1976
INVENTOR(S) : Donald E. Christofer It is certified that error appears in the above—identified patent and that said Letters Patent are hereby corrected as shown below:

Column 7,
Lines 44 to 55 should read as follows:

a flexible elongated power conveying member connected to said carriage at one end and operatively associated with said axle and adapted to transmit power to said drive means from a power source, said axle being rotated in one direction as a linear function of the forward travel of said carriage, and in the opposite direction as a linear function of the reverse travel of said carriage, and means at the side of said wall opposite the side at which said carriage is located for controlling said power source said means including electrical switch means operable in response to the direction and amount of rotation of said axle, Signed and Sealed this Fourteenth Day of September 1976

[SEAL]

Attest:

RUTH C. MASON
*Attesting Officer*

C. MARSHALL DANN
*Commissioner of Patents and Trademarks*